(12) United States Patent
Coursaux et al.

(10) Patent No.: US 11,880,425 B2
(45) Date of Patent: Jan. 23, 2024

(54) SYSTEM AND METHOD FOR IDENTIFYING AND CORRECTING WEBPAGE ZONE TARGET MISIDENTIFICATIONS

(71) Applicant: Content Square SAS, Paris (FR)

(72) Inventors: Paul Coursaux, Paris (FR); Lionel Seguin, Paris (FR); Mohamed-Amine Baatout, Paris (FR)

(73) Assignee: Content Square SAS, Paris (FR)

( * ) Notice: Subject to any disclaimer, the term of this patent is extended or adjusted under 35 U.S.C. 154(b) by 34 days.

(21) Appl. No.: 17/221,487

(22) Filed: Apr. 2, 2021

(65) Prior Publication Data

US 2022/0318323 A1 Oct. 6, 2022

(51) Int. Cl.
| | | |
|---|---|---|
| *G06F 16/958* | (2019.01) | |
| *G06F 8/75* | (2018.01) | |
| *G06F 16/954* | (2019.01) | |
| *G06F 3/0482* | (2013.01) | |
| *G06F 9/54* | (2006.01) | |

(52) U.S. Cl.
CPC ........... *G06F 16/958* (2019.01); *G06F 8/75* (2013.01); *G06F 16/954* (2019.01); *G06F 3/0482* (2013.01); *G06F 9/541* (2013.01)

(58) Field of Classification Search
CPC ......... G06F 16/958; G06F 8/75; G06F 16/954
See application file for complete search history.

(56) References Cited

U.S. PATENT DOCUMENTS

| | | | |
|---|---|---|---|
| 5,563,515 A | 10/1996 | Kako | |
| 7,683,781 B2 | 3/2010 | Kantrowitz et al. | |
| 8,204,950 B2 | 6/2012 | Alperin | |
| 8,511,551 B1 | 8/2013 | Foster et al. | |
| 9,235,429 B1 | 1/2016 | Mehr | |
| 9,799,131 B1 | 10/2017 | Demiralp et al. | |
| 9,865,261 B2 | 1/2018 | Goenka et al. | |
| 9,996,613 B2 | 6/2018 | Jadhav et al. | |
| 10,341,319 B2 | 7/2019 | Gupta et al. | |
| 10,402,463 B2 | 9/2019 | Black et al. | |
| 10,447,758 B2 | 10/2019 | Shu et al. | |
| 10,592,381 B1 | 3/2020 | Hamilton | |
| 10,705,803 B2 | 7/2020 | Zhang et al. | |
| 10,783,516 B2 | 9/2020 | Benkreira et al. | |
| 11,243,867 B1 * | 2/2022 | Wexler | G06F 16/958 |
| 2007/0013528 A1 | 1/2007 | Kantrowitz et al. | |
| 2007/0061410 A1 | 3/2007 | Alperin | |

(Continued)

*Primary Examiner* — Cesar B Paula
*Assistant Examiner* — John M Heffington
(74) *Attorney, Agent, or Firm* — Schwegman Lundberg & Woessner, P.A.

(57) ABSTRACT

A system and method for identifying and correcting webpage zone target misidentification are provided. The method includes clustering a plurality of webpage nodes based on at least zoning information derived from a webpage to identify at least two similar webpage node clusters, wherein the clustered webpage nodes are included in the zoning information, and wherein at least two webpage node clusters indicates at least a zone target misidentification; generating at least a zone identification issue fix suggestion for each identified zone target misidentification, wherein a zone identification issue fix suggestion is a suggestion providing a correction for a respective zone target misidentification; and applying each of the generated zone target misidentifications on a respective zone target misidentification.

22 Claims, 7 Drawing Sheets

(56) References Cited

U.S. PATENT DOCUMENTS

| | | |
|---|---|---|
| 2007/0294371 A1 | 12/2007 | Petri |
| 2008/0184128 A1 | 7/2008 | Swenson et al. |
| 2009/0144612 A1 | 6/2009 | Ishii et al. |
| 2009/0299861 A1* | 12/2009 | Littlefield .............. G06Q 40/00 715/764 |
| 2010/0174985 A1* | 7/2010 | Levy .................... G06F 40/106 715/244 |
| 2014/0068411 A1 | 3/2014 | Ross et al. |
| 2016/0119444 A1* | 4/2016 | Pinkovezky .......... H04L 67/306 709/204 |
| 2016/0261475 A1 | 9/2016 | Jadhav et al. |
| 2016/0275092 A1 | 9/2016 | Black et al. |
| 2017/0098448 A1 | 4/2017 | Goenka et al. |
| 2017/0171285 A1 | 6/2017 | Shu et al. |
| 2017/0237723 A1 | 8/2017 | Gupta et al. |
| 2017/0309047 A1 | 10/2017 | Demiralp et al. |
| 2018/0052808 A1* | 2/2018 | Wan ................... G06F 16/9577 |
| 2018/0067845 A1* | 3/2018 | Costello, Jr. ........ G06F 11/3684 |
| 2019/0260728 A1 | 8/2019 | Gupta et al. |
| 2019/0279084 A1 | 9/2019 | Darachi et al. |
| 2019/0318343 A1 | 10/2019 | Benkreira et al. |
| 2019/0340204 A1 | 11/2019 | Black et al. |
| 2020/0097259 A1 | 3/2020 | Zhang et al. |
| 2020/0371900 A1 | 11/2020 | Murugesan |
| 2020/0380498 A1 | 12/2020 | Benkreira et al. |
| 2020/0401431 A1 | 12/2020 | Rashid et al. |

\* cited by examiner

SYSTEM AND METHOD FOR IDENTIFYING AND CORRECTING WEBPAGE ZONE TARGET MISIDENTIFICATIONS

TECHNICAL FIELD

The present disclosure relates generally to webpage zone analysis and, in particular, to systems and methods for identifying and correcting webpage zone target misidentifications.

BACKGROUND

As businesses, governments, and other organizations expand the quality and volume of web-enabled services, the same organizations may seek to better understand the performance of the deployed web services. One popular form of web service, the website, provides for accessible, interactive, user engagement with one or more of an organization's web services. Organizations may use websites to market and sell products, to connect users with service providers, and to otherwise advance organizational goals. In order to better understand the performance of deployed websites, such organizations may employ various analytics tools. However, such analytics tools may fail to provide for the inclusion of certain features which website hosts may desire, leading to sub-standard web analytics experiences.

In order to better understand website performance, site administrators may employ web analytics tools configured to record and interpret user interactions with websites and website contents. Certain analytics tools may provide functionalities including web session tracking, automated website zone or element identification, statistical analyses of collected data, and the like. However, such presently-deployed solutions may fail to account for the dynamic nature of web content, causing discrepancies between different analyses of the same website, and the like, and, therefore, leading to unreliable data and analytics. In particular, such presently-available solutions may fail to provide for the detection of certain mischaracterizations, misidentifications, and errors in webpage zone analysis, causing such analyses to vary from webpage to webpage and from session to session, despite the inclusion of similar or identical elements or zones in such sessions and webpages.

As zone analysis provides for automated collection and enhanced analysis of webpage information, session data, and site statistics, such analyses may be beneficial to organizations seeking to better understand website performance. However, as websites may include dynamic contents, such as blocks configured to display banner ads of various sizes, the layout of a given webpage may differ from user to user, limiting the applicability of automated zone analysis tools. Further, in addition to varying layouts from user to user, automated zone analysis may be hindered by any errors present in the zone classification analysis, leading to misidentification of zones and, therefore, flawed data, where presently-available solutions may not be configured to address such errors.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the terms "some embodiments" or "certain embodiments" may be used herein to refer to a single embodiment or multiple embodiments of the disclosure.

Certain embodiments disclosed herein include a method for identifying and correcting webpage zone target misidentifications. The method comprises: clustering a plurality of webpage nodes based on at least zoning information derived from a webpage to identify at least two similar webpage node clusters, wherein the clustered webpage nodes are included in the zoning information, and wherein at least two webpage node clusters indicates at least a zone target misidentification; generating at least a zone identification issue fix suggestion for each identified zone target misidentification, wherein a zone identification issue fix suggestion is a suggestion providing a correction for a respective zone target misidentification; and applying each of the generated zone target misidentifications on a respective zone target misidentification.

Certain embodiments disclosed herein also include a non-transitory computer readable medium having stored thereon instructions for causing a processing circuitry to execute a process for identifying and correcting webpage zone target misidentifications, the process comprising: clustering a plurality of webpage nodes based on at least zoning information derived from a webpage to identify at least two similar webpage node clusters, wherein the clustered webpage nodes are included in the zoning information, and wherein at least two webpage node clusters indicates at least a zone target misidentification; generating at least a zone identification issue fix suggestion for each identified zone target misidentification, wherein a zone identification issue fix suggestion is a suggestion providing a correction for a respective zone target misidentification; and applying each of the generated zone target misidentifications on a respective zone target misidentification.

In addition, certain embodiments disclosed herein include a system for identifying and correcting webpage zone target misidentifications. The system comprises: a processing circuitry; and a memory, the memory containing instructions that, when executed by the processing circuitry, configure the system to: cluster a plurality of webpage nodes based on at least zoning information derived from a webpage to identify at least two similar webpage node clusters, wherein the clustered webpage nodes are included in the zoning information, and wherein at least two webpage node clusters indicates at least a zone target misidentification; generate at least a zone identification issue fix suggestion for each identified zone target misidentification, wherein a zone identification issue fix suggestion is a suggestion providing a correction for a respective zone target misidentification; and apply each of the generated zone target misidentifications on a respective zone target misidentification.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The embodiments disclosed herein provide solutions to the identification and correction of misidentified zone targets. As may be applicable to the embodiments disclosed herein, a zone is a webpage feature or element which is included in a webpage's root HTML, or other, like, source code, as well as the corresponding DOM, or the like. Examples of zones in webpages include, without limitation, banner advertisements, product images, clickable buttons, and the like. The embodiments disclosed herein provide specific advantages in the identification and correction of misidentified zone targets. Specifically, the disclosed embodiments provide for reduction of zone identification and correction processing times, providing for improvements in zone automation latency and further providing for improvements in computational efficiency in zone target identification and correction.

Specific types of such zone target misidentification or mischaracterization errors include, without limitation, zone existence problems, one zone for multiple targets (OZMT) problems, one target for multiple zones (OTMZ) problems, and the like. As is applicable to OZMT and OTMZ problems, as described, a target refers to an identifier computed for a webpage node, such as an HTML node, or corresponding DOM node. A DOM node, as may be relevant to the various embodiments described herein, is a feature of a Document Object Model (DOM), where the DOM node corresponds to a given HTML element or zone. An example DOM is described with respect to FIG. 5, below. Further, target values may be variously-computed based on various webpage properties including, without limitation, tag names, element classes, specific attributes, and the like, as well as any combination thereof.

Zone existence problems include zone analysis issues arising from the existence of a webpage zone which is not rendered for each pageview, but which is treated as having been repeatably rendered during zone metric analyses, leading to skewed zone analysis statistics. OZMT problems include zone analysis issues arising from the same zone, such as a search bar, being separately-targeted, such as by different HTML target paths, for different pageviews, also leading to skewed zone analyses. In addition, OTMZ problems include zone analysis issues arising from identical targets, such as HTML target paths, which identify different zones across multiple pageviews, such as identification of a search bar and a home button, for the same target path, for different pageviews.

Figure 1:
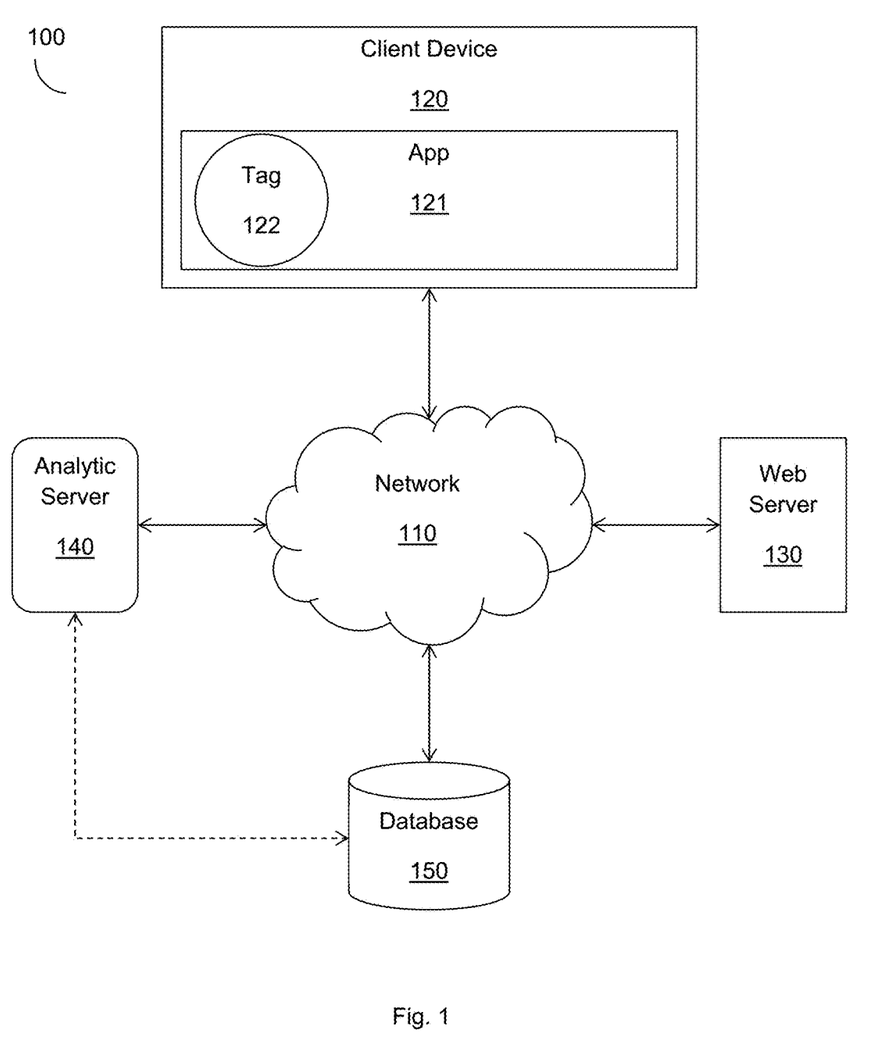
FIG. 1 is a network diagram depicting a network system disclosing embodiments for identifying and correcting webpage zone target misidentifications, according to an embodiment.

FIG. 1 is an example network diagram depicting a network system 100 disclosing embodiments for identifying and correcting webpage zone target misidentifications, according to an embodiment. The system 100 includes a client device 120, the client device including an application (app) 121, the app 121 further including a tag 122. The system 100 further includes, an analytic server 140. In addition, the system 100 includes a web server 130 and a database 150. In the system 100, the various components listed are interconnected via a network 110.

It may be understood that the configuration of the system 100, described with respect to FIG. 1, is so presented for purposes of simplicity, and that other, like, configurations may be likewise applicable without loss of generality or departure from the scope of the disclosure. As a first example of such alternate configurations, the system 100 may include multiple client devices 120, multiple web servers 130, and the like, as well as any combination thereof. Further, as a second example, the database 150 may be included within the analytic server 140.

The network 110 provides interconnectivity between the various components of the system. The network 110 may be, but is not limited to, a wireless, cellular, or wired network, a local area network (LAN), a wide area network (WAN), a metro area network (MAN), the Internet, the worldwide web (WWW), similar networks, and any combination thereof. The network may be a full-physical network, including exclusively physical hardware, a fully-virtual network, including only simulated or otherwise virtualized components, or a hybrid physical-virtual network, including both physical and virtualized components. Further, the network 110 may be configured to encrypt data, both at rest and in motion, and to transmit encrypted, unencrypted, or partially-encrypted data.

The network 110 may be configured to connect to the various components of the system 100 via wireless means such as, as examples and without limitation, Bluetooth (tm), long-term evolution (LTE), Wi-Fi, other, like, wireless means, and any combination thereof, via wired means such as, as examples and without limitation, ethernet, universal serial bus (USB), other, like, wired means, and any combination thereof. Further, the network 110 may be configured to connect with the various components of the system 100 via any combination of wired and wireless means.

The client device 120 is a device through which a user, client, or the like, engages with one or more content features retrieved from, or provided by, the web server 130. Examples of client devices 120 include various computing devices such as, without limitation, personal computers, tablets, smartphones, and the like. The client device 120 may include various input components such as, as examples and without limitation, mice, keyboards, touchscreens, and the like, as well as any combination thereof, providing for user interaction with content retrieved from, or provided by, the web server 130. Further, the client device 120 may include one or more output devices such as, as examples and without limitation, displays, speakers, and the like, as well as any combination thereof, providing for further user interaction with web server 130 content. In addition, the client device may include one or more apps 121, as described hereinbelow.

The application (app) 121 is a program, script, instruction set, or other, like, data feature configured to provide for user interaction with one or more web server 130 content features. The app 121 may be, without limitation, a dedicated application which is specific to a given platform or website, a web browser, configured to provide for interaction with one or more websites, or the like, as well as any combination thereof. Apps 121 may be downloaded from central repositories such as, as examples and without limitation, the Apple® App Store, the Google® play store, or the like. Further, where the app 121 is a web browser, the app 121 may be a web browser such as, as examples and without limitation, Safari®, Firefox®, Internet Explorer®, Chrome®, and the like. Further, the app 121 may include, or otherwise provide for the implementation or execution of, one or more tags 122, as described hereinbelow.

The tag 122 is a script, code element, or other, like, data feature, configured to collect activity relating to a client's interaction with web server 130 content through the app 121. The tag 122 may be included in one or more web server 130 data features accessed through the client device 120, providing for collection, via the tag, of various data features describing a user's interactions with web content. As an example, where a user, through a web browser app 121 included in the client device, accesses a web page hosted on the web server 130, the accessed web page may include a tag 122, which, when downloaded to the user device as a part of the accessed webpage content, provides for collection of various user activity data.

The tag 122 may be included within the source code of a webpage, such as the hypertext markup language (HTML) code underlying such a webpage, where such source code is hosted by the web server 130. Where a user connects to the web server 130 and requests to visit a given webpage, the underlying code for the webpage is downloaded to the client device 120 and rendered thereupon, including the tag 122, providing for user interaction with the webpage, as well as for data collection by the tag 122.

The tag 122 may be configured to collect various user activity data features including, as examples and without limitation, client device 120 type, app 121 type, client device 120 geolocation, client device 120 internet protocol (IP) address, uniform resource locators (URLs) accessed by the client device 120, client device 120 screen resolution, referrer URLs, user clicks, user hovers, user scrolls, user mouse movements, and the like, as well as any combination thereof. Further, the tag 122 may be configured to apply one or more methods, processes, or the like, to or on such user activity data features.

The web server 130 is a web-based source of data. The web server 130 may include data relating to websites, data relating to webpages, other, like, data, and any combination thereof. Web servers 130 may be local web sources, remote web sources, or any combination thereof. Examples of web servers 130 include, without limitation, repositories of webpage information, repositories of webpage element or zone information, "live" webpages, other, like, sources, and any combination thereof. Web servers 130 may be connected with the network 110 via the means described hereinabove.

The analytic server 140, depicted in detail with respect to FIG. 6, below, is a system configured to execute instructions, organize information, and otherwise process data. The analytic server 140 may be configured to execute the methods described with respect to FIGS. 2 and 3 hereinbelow, other, like, methods, and any combination thereof. As described with respect to FIG. 6, below, the analytic server 140 may include various processing, memory, networking, and other components allowing the analytic server 140 to execute instructions and provide data processing. The analytic server 140 may be implemented as physical hardware, as software virtualizing physical hardware, or as a combination of physical and virtualized components. The analytic server 140 may be connected to the network 110 via those means described with respect to the network 110, above. The various processes performed by the analytic server 140 are described in greater detail hereinbelow. It may be understood that the analytic server 140 may be deployed as an on-premises server, which may be co-located with one or more of the web server 130, the database 150, or the like, or as an off-premises server, such as a server included within a cloud environment, without loss of generality or departure from the scope of the disclosure.

The database 150 is a data store configured to archive data permanently or semi-permanently. The database 150 may be configured to store information received from one or more web servers 130, client devices 120, and other, like, components, as well as to store data relevant to the operation of the analytic server 140 and any outputs therefrom. The database 150 may be a local system, a remote system, or a hybrid remote-local system. Further, the database 150 may be configured as a full-physical system, including exclusively physical components, as a virtualized system, including virtualized components, or as a hybrid physical-virtual system. Examples of devices which may be configured as a database 150 in the system 100 include, without limitation, local database hardware, cloud storage systems, remote storage servers, other, like, devices, and any combination thereof. Further, the database 150 may be directly connected to the analytic server 140, such as without an intermediate connection to the network 110, including via connections similar or identical to those described with respect to the network 110.

According to an embodiment, the database 150 may be configured to store or otherwise archive data relating to one or more sessions, including, without limitation user interactions, user sessions, other, like, data, and any combination thereof. Further, the database 150 may be configured to transfer, to and from the analytic server 140, data necessary for the execution of the methods described hereinbelow, and may store or otherwise archive analytic server 140 inputs, analytic server 140 outputs, or both.

As an example of a potential use-case involving the system 100, as may be relevant to the descriptions provided herein, a user may attempt to access an e-commerce website to purchase office supplies. The user may, through the client device 120, and a browser app 121 included therein, generate a request to access the e-commerce site. The request, when received by the web server 130, may configure the web server 130 to send a copy of the e-commerce site webpage to the client device 120, including the tag 122. During the course of the user's session, the tag 122 may collect session data and transmit such data to the analytic server 140 for processing and storage in the database 150.

According to the same example, where the user re-loads the webpage, such as after restarting the computer, the webpage may include the same elements, such as buttons, images, and the like, as were included during the user's first visit to the page. However, on the user's second visit to the webpage, the placements of the various elements may not be identical to the placements of the same elements in the version of the webpage loaded during the use's first visit. The difference in element placement may be due to the addition of a "continue shopping" banner to the top of the webpage, the addition of which may be triggered by the web server's detection of the same user initializing a second session for the same webpage. Accordingly, while the two versions of the webpage may display the same or similar contents, the identical elements may still be re-arranged or displaced during the second visit, as compared to the first.

According to the same example, where the difference between the webpages may be visually-disconcerting for the user, the same difference may pose an identification challenge to a zone identification routine executed by the tag 122. Such a routine may be configured to identify zones based on the HTML or DOM attributes of such zones, and may, accordingly, mis-identify various zones on the user's second visit due to the described difference in webpage layout. In response to such mis-identification, the analytic server 140 may be configured to provide one or more correction functionalities, including those described hereinbelow, providing for re-identification of webpage zones and consistent zone identification across multiple sessions.

Figure 2:
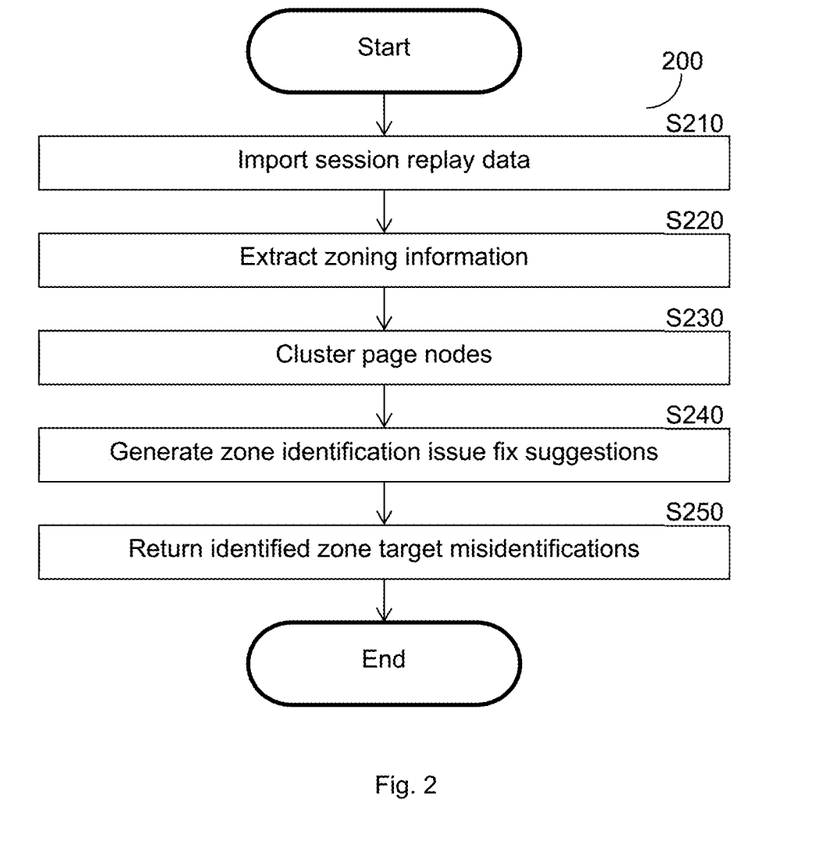
FIG. 2 is a flowchart depicting a method for identifying misidentified zone targets, according to an embodiment.

FIG. 2 is an example flowchart 200 depicting a method for identifying misidentified zone targets, according to an embodiment. Identification of misidentified zone targets provides a "detect and inform" functionality, whereby misidentified zone targets, and other, relevant, webpage features, may be automatically identified for remediation by site operators and administrators. The method described with respect to FIG. 2 may be implemented or executed by one or more of the systems, devices, or components of the network system of FIG. 1, including, without limitation, the analytic server, 140.

At S210, session replay data is imported or otherwise received. Session replay data is data describing one or more historical user journeys through a webpage or set of webpages. Session replay data may include various identifying data such as, without limitation, the webpage or webpages included in the session, the user's web browser version, connection IP address, and the like, as well as any combination thereof. Further, session replay data may include one or more session events, arranged in order of occurrence, where a session event is a user interaction with a webpage zone or element. Such interactions may include, as examples and without limitation, keystrokes by which a user enters text in a text field, mouse clicks by which a user activates a button, mouse scroll events, navigation to or from a webpage, and the like. Session replay data may be recorded during a session, such as by the tag, 122, of FIG. 1, above. Session replay data may be imported from one or more sources including, without limitation, stores, or repositories of session replay data, such as the database, 150, of FIG. 1, above, data feeds or other, like, outputs which provide session replay data, where such feeds may be collected from, for example, the tag, 122, of FIG. 1, above, other, like, sources, and any combination thereof.

At S220, zoning information is extracted. Zoning information may be data, information, or the like, relevant to the contents and structure of a webpage. Zoning information may include, without limitation, descriptions of zone or element placements, relationships, contents, and the like, as well as any combination thereof. Extraction of zoning information at S220 may include identification and recordation of webpage HTML information, DOM information, and the like, as well as zone or element targets and target paths, and any combination thereof.

At S230, page nodes are clustered. In an example embodiment, page nodes may include HTML nodes, as may relate to corresponding webpage DOM nodes, and which may be clustered based on node target. During clustering, nodes for a given webpage, corresponding to various zones or elements thereof, are clustered according to the target of each respective zone or element. In clustering, unique zone or element targets are identified, such as for "all versions," "some versions," and the like, providing for identification of unique zone or element targets appearing in all renditions of a given webpage, identification of unique zone or element targets appearing in some renditions of a given webpage, such as, for example, ninety percent thereof, and the like.

During clustering at S230, identified unique targets may be clustered individually, with each node having the same unique target included in the same cluster set.

A node, as may correspond to a webpage element or zone, may be extracted, as at S220, where such extraction may include extraction of one or more node properties or features including, without limitation, zone or element positions, zone, or element clickability status, and the like, as well as any combination thereof, as described herein. As an element target path may include hierarchical information describing the zone or element's relationship to other zones or elements, such as may be graphically depicted in a corresponding DOM tree, analysis of such hierarchical target information may provide for the identification of differences between target paths based on target path content values, despite the paths indicating the same target. Further, an element target path may include one or more data features representing non-structural attributes of the referenced target zone, such as, as examples and without limitation, whether the target zone or element is clickable, whether the target zone or element is of a specific type or class, and the like, as well as any combination thereof. As an example, a first target path may be given as: "html:eq(0)>body:eq(0)>div:eq(2)>div:eq(1)>div:eq(0)>div:eq(0)>div:eq(0)." Although only one target may be indicated by the given path, the same path may, for various versions of the same webpage, indicate different zones or elements, creating an OTMZ error, as described hereinabove.

Further, during clustering at S230, nodes having the same unique target may be clustered together by application of one or more clustering algorithms. Clustering may include clustering of target paths with matching unique targets, according to the values of the unique targets. According to an example, a set of several nodes, each node having its own target path indicating either "target A" or "target B," may be clustered into clusters "A" and "B" based on respective target values.

Subsequently, the similarities of the target paths within each cluster may be determined based on a distance factor, where the distance factor describes the similarity of two or more target paths within a cluster. Analysis of in-cluster distances, such as between a first clustered node and a second clustered node, may provide for identification of nodes which are similar to, or dissimilar from, other nodes in the same cluster. Outliers, or nodes which are improperly included in a cluster, may be identified by comparison of node distance values with in-cluster distance values, such that, where a given node has a greater similarity to a second cluster than to the first cluster, where the node is included in the first cluster, the node may be identified as properly belonging to the cluster in which the node is not included, indicating that the node may be properly identified as indicating a different target, such as the target relevant to the second cluster.

Accordingly, where, during the application of one or more clustering algorithms, at S230, more than one clusters are generated, detected, or the like, by application of such algorithms, the presence of multiple clusters may indicate the presence of multiple targets for a cluster intended to represent a single cluster, and, thus, the presence of a misidentification error.

The described clustering and analysis process may be executed by one or more automated processes, including machine learning (ML), providing for the return, after the execution of clustering and analysis, of one or more zone identification issues. A zone identification issue may be a statement, notification, or other, like, data feature configured to indicate the presence of multiple clusters for a single target. As an example, a zone identification issue, returned based on analysis as described hereinabove, may be a statement indicating that "four unique zones have the same target, target A."

At S240 zone identification issue fix suggestions may be generated. Zone identification issue fix suggestions are suggestions relevant to the correction of one or more target misidentifications. As noted above, target misidentifications may be determined by clustering analysis, as described with respect to S230. Generation of zone identification issue fix suggestions at S240 may include execution of one or more fix suggestion generation methods or processes including, without limitation, the method of FIG. 3, below.

At S250, identified zone target misidentifications are returned. Identified zone target misidentifications are target paths, as included in the target path clusters returned at S230, which are identified as being included in an improper cluster, such as by, as described, having a similarity value, represented by distance, which better corresponds to a different cluster than to the cluster in which the target path is included. Execution of S250 may include generation of one or more warnings, where such warnings may provide indications of identified misidentifications.

Figure 3:
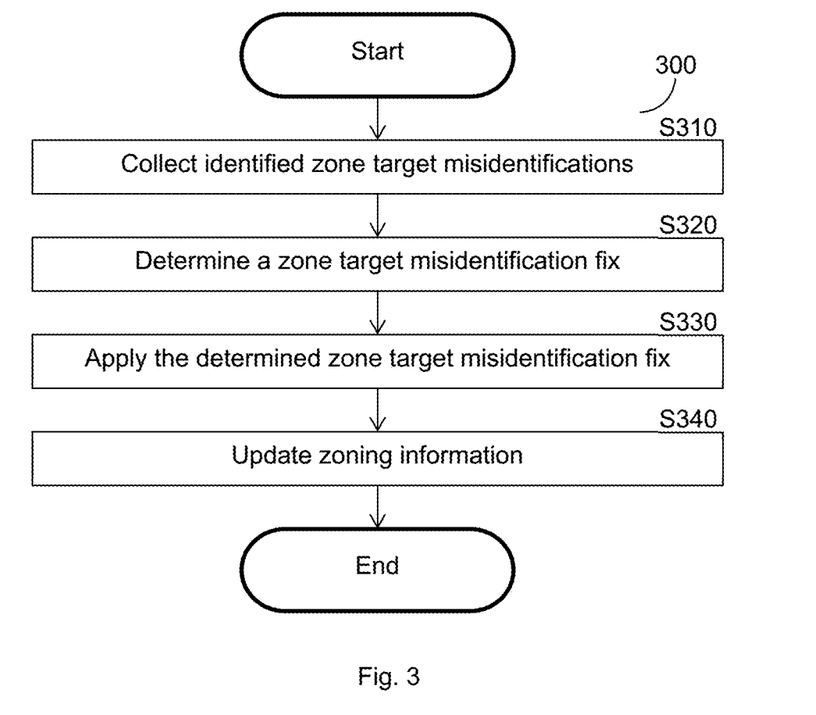
FIG. 3 is a flowchart depicting a method for correcting misidentified zone targets, according to an embodiment.

FIG. 3 is an example flowchart 300 depicting a method for correcting misidentified zone targets, according to an embodiment. The method described with respect to FIG. 3 may be implemented or executed by one or more of the systems, devices, or components of the network system of FIG. 1, including, without limitation, the analytic server, 140.

At S310, identified zone target misidentifications are collected. Identified zone target misidentifications may be collected by importing one or more session replay data features. The imported session replay data features may be session replay data features relevant to one or more webpages considered during analysis according to the method of FIG. 3. The imported session replay data features may be data features similar or identical to those data features returned at S250 of FIG. 2, above. Further, identified zone target misidentifications, including session replay data features, may be collected from one or more sources including, without limitation, the database (DB) 150 of FIG. 1, above, a data stream, or other, like, output of a zone target misidentification process, such as that described with respect to FIG. 2, above, from other, like, sources, and any combination thereof.

At S320, a target misidentification fix is determined. A target misidentification fix includes one or more updates to various elements of the zone analysis system, including, without limitation, zone identification algorithms, stored zone identification records, and the like, as well as any combination thereof. A target misidentification fix may be determined by analysis of various factors including, without limitation, the identity of the client or website for which zone analysis is performed, current zone classifications and identities, user or administrator input or override, and the like, as well as any combination thereof.

Further, determination of a target misidentification fix at S320 may include analysis of one or more relevant pageviews, where relevant pageviews may be those pageviews which include a misidentification, such as may be identified as described with respect to FIG. 2. Such analysis may include analysis of one or more HTML or Cascading Style Sheets (CSS) elements, and properties thereof, including, without limitation, element classes, element attributes, element tagnames, and the like, as well as any combination thereof. Further, such analysis may include consideration of whether applying a fix relevant to a specific HTML or CSS element property will provide for correction of the identified target misidentification error.

As an example, where, for a given webpage, two separate, distinct zones include the same target, a misidentification error may be identified. Where, according to the same example, the first of the two zones has a separate class in the webpage DOM, a fix which corrects target identification based on element DOM classes may provide for correction of the error. Accordingly, where such a difference is included in the set of zones or elements included in a webpage, a corresponding target misidentification fix may be determined, at S320, as a fix which provides for correction of the misidentification error based on the identified zone or element difference.

A determined fix may include re-labeling or otherwise correcting one or more labels, tags, or other, like, identifying data features associated with the various webpage elements or zones. Further, determination of a target misidentification fix may include the determination of whether to apply a new target fix or a custom fix. In an embodiment, determination of a target misidentification fix may include determination of one or more target misidentification fix schedules, where a target misidentification fix schedule may specify, for example and without limitation, the application of a first fix during a first time period and the application of a second fix during a second time period, and the like, as well as various combinations thereof.

A custom fix, as may be determined for application at S320, is a fix providing for per-case correction of zoning errors. A custom fix may be implemented on a per-client basis, such as by implementation for each webpage of a given web host's webpage suite. A custom fix may be implemented to change the computation of targets for webpage zones or elements including by configuring the tag 122 of FIG. 1, above, to treat an element or zone's class, in the corresponding DOM, as the element or zone's identity, providing for use of the respective class or attribute as the element or zone's identity (ID). Further, a custom fix may include, without limitation, ignoring one or more element or zone IDs, treating one or more element attributes as an ID for the corresponding element, other, like, techniques including the treatment of HTML data as relevant to the technique applied, as well as any combination thereof.

Further, a new target fix, as may be determined for application at S320, is a high-information fix for various zoning errors. A new target fix may include the transmission of, for every element interaction, an enhanced element and target dataset, where, without such a fix, such transmissions may be limited only to the target path relevant to each interaction event. Where a new target fix includes the transmission of an enhanced element and target dataset, the enhanced element and target dataset may include element interaction details including, without limitation, the target path of the relevant element, the HTML/DOM class or attribute of the relevant element, various HTML or CSS element properties, and the like, as well as any combination thereof. The new target fix may include, during application at S330, without limitation, the re-classification of zones or elements based on properties, the correction of targets, providing for correction of corrupted data, the addition of zoning rules to one or more zoning processes, where such zoning rules may be configured to provide for revised target classification, and the like, as well as any combination thereof. Further, a new target fix may be an iterative fix, providing for repeated correction of multiple elements or zones included in a hierarchical structure, such as nested HTML elements. In addition, a new target fix may be a retroactive fix, providing for correction of zoning information in recorded session replays, and the like, where such retroactive fixes may provide for enhancement or correction of data based on recorded session replays, such as statistical data reflecting zone information across multiple sessions.

At S330, the determined target misidentification fix is applied. The target misidentification fix, determined as described with respect to S320, is a change providing for the correction of a zone or element target or ID to the correct, corresponding zone or element target or ID. Where application of the determined target misidentification fix at S330 includes application of a custom target fix, the application of the custom target fix may include issuing one or more commands, instructions, or the like, to various relevant tag-origination services included in the web server or servers 130 of FIG. 1, above. The commands or instructions issued to the tag-origination services may be configured to update one or more tags to provide for transmission of updated tags, with a webpage, when a user requests a tag-enabled webpage by navigating to or within a website. The updated tag may be configured to apply one or more updated settings in place of previous tag settings, the updated tag settings providing for execution of zoning processes consistent with the target misidentification fix determined at S320.

Further, where application of the determined target misidentification fix at S330 includes application of a new target fix, application of the new target fix may include updating one or more target analysis methods or routines of the analytic server 140 to provide for automatic target detection without requiring updates to tags or tag-origination services.

At S340, zoning information is updated. Updating zoning information at S340 may include updating zoning information for individual pageviews, and the like, as well as any combination thereof. Where updating zoning information includes updating zoning information for individual pageviews, the tag 122, of FIG. 1, above, may be updated to include one or more zoning rules relevant to a given webpage or set of webpages, providing for in-session identification of webpage zones or elements according to the fixes described hereinabove. Further, updating zoning information at S340 may include generating, displaying, or otherwise returning one or more zoning, targeting, or other, like, reports or analyses, including, without limitation, reports or analyses similar or identical to those described with respect to FIGS. 4A and 4B, below.

Figure 4A:
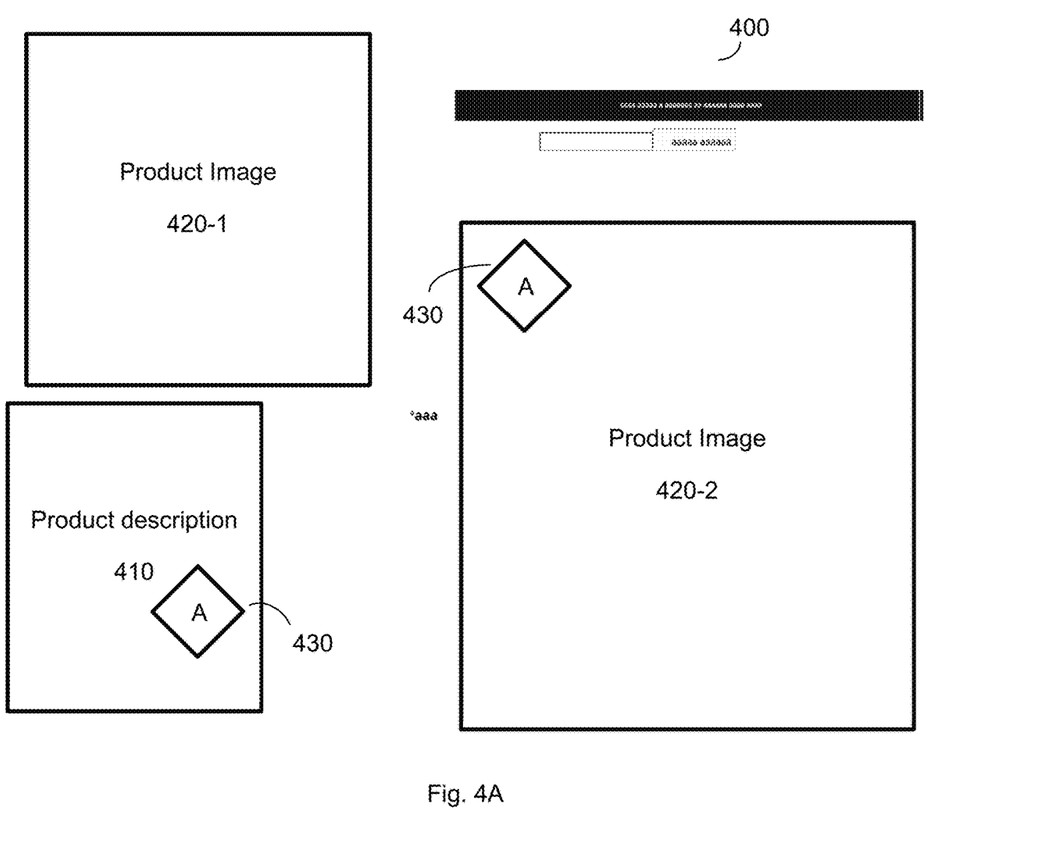
FIG. 4A is a webpage layout illustrating a zone target misidentification error, according to an embodiment.

FIG. 4A is an example webpage layout 400 illustrating a zone target misidentification error, according to an embodiment. The example webpage layout 400 is a sample webpage for an e-commerce website, provided to illustrate a potential misidentification error, as described herein. The webpage layout 400 includes a product description 410, two product images 420-1 and 420-2, and a target identification indicator 430, placed twice within the layout 400.

As described hereinabove, the product description 410 and two product images, 420-1 and 420-2, are webpage elements, including properties corresponding to the types, positions, and other, like, features of the elements. The product description 410 may be a text box, and may further include information describing the size, placement, clickability, and other, like, properties of the product description 410. The product images, 420-1 and 420-2, are photos, graphics, or other, like, images, including identical images. While the product images 420-1 and 420-2 may be the same or similar in content, data features describing the size and placements of the images may differ, providing for HTML-based or DOM-based differentiation between the images.

The target identification indicator 430 is an example indicator, providing for notification of one or more clients, users, or the like, of the identified targets with which the indicators 430 are associated. In the example layout 400, the same indicator 430 is relevant to both the product description 410 and the product image 420-2. As the product description 410 and product image 420-2 include different contents, different content types, different sizes, and different placements, the two elements may have different targets. Therefore, inclusion of the same indicator 430 for both the product description 410 and the product image 420-2 may indicate that one or more methods or routines for identifying zone or element targets has failed to properly identify the targets of both elements, indicating a target misidentification error, as described herein.

It should be understood that the target identification indicator 430 is depicted as a visible element only for purposes of illustration. The target identification indicator 430 may be, without limitation, a visible feature added to a zone or element, as shown, an overlay, such as a colored, translucent, or other, like, overlay, added on top of a zone or element, another, like, type of indicator, or any combination thereof.

Figure 4B:
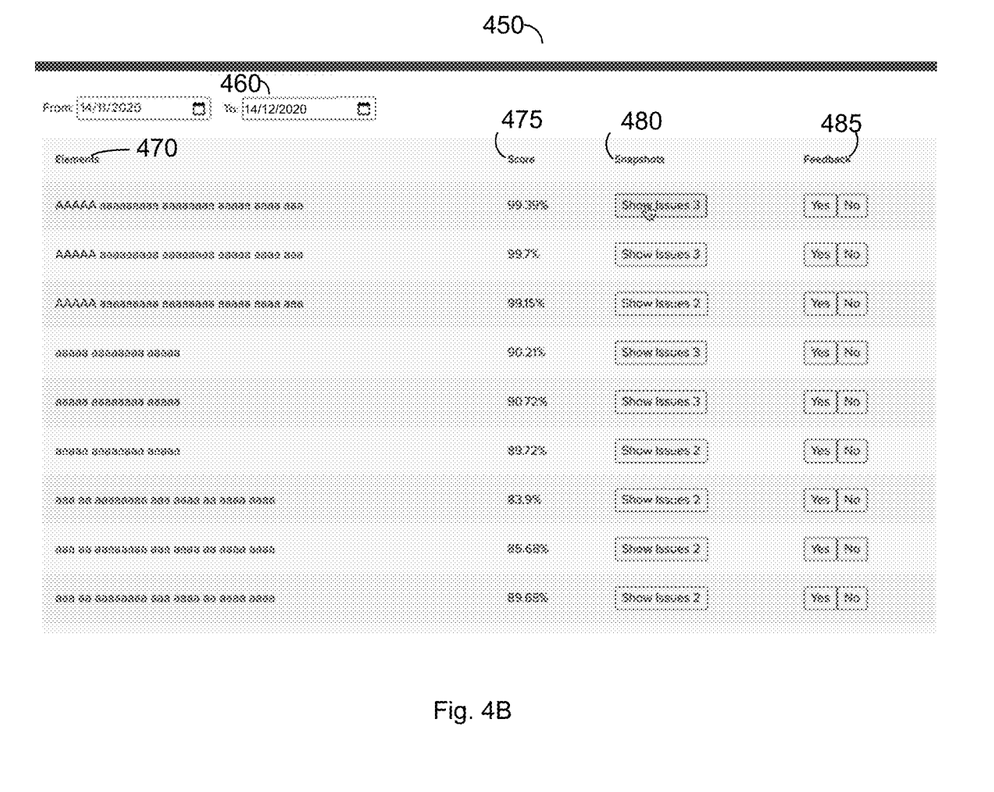
FIG. 4B is a zone target misidentification report, according to an embodiment.

FIG. 4B is an example zone target misidentification report 450, according to an embodiment. The example report 450 provides for display and selection of one or more per-element target misidentification summaries or outputs. The report 450 includes a date range selector 460, configured to provide for analysis of one or more per-element target misidentification summaries for misidentification events occurring within the specified date range. Further, the report 450 includes an element indicator 450, configured to provide for selection of the various data analysis features, 470-485, for each element listed. The data analysis features include a probability report 475, describing the likelihood of a match between a zone or element's identified target and the same zone or element's intended target. Further, the report 450 includes a snapshot selector 480, configured to provide for per-element selection of misidentification snapshots. In addition, the report includes a feedback selector 485, providing for indication of whether an identified mistargeting issue was correctly identified.

Figure 5:
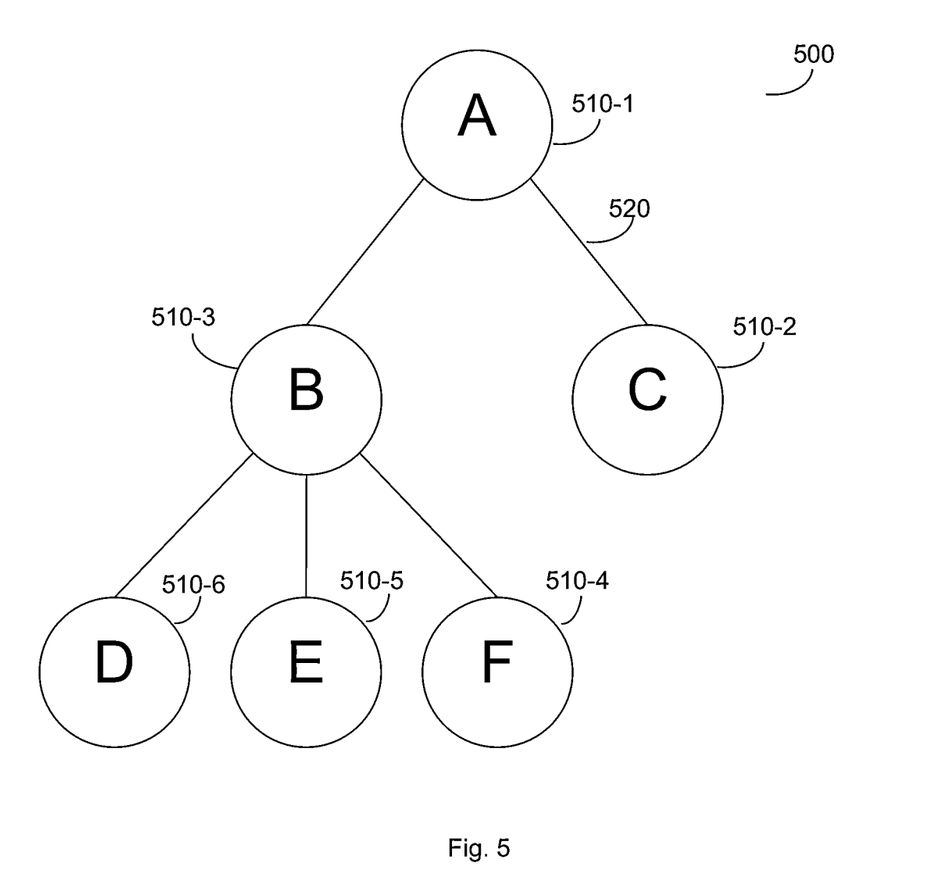
FIG. 5 is a diagram depicting an unlabeled document object model (DOM) tree, according to an embodiment.

FIG. 5 is an example diagram depicting an unlabeled document object model (DOM) tree 500, according to an embodiment. The unlabeled DOM tree 500 provides a visual representation of the hierarchical structure of a webpage's HTML code, with content zones or elements represented as nodes, 510-1 through 510-6 (hereinafter, "nodes" 510). In the example unlabeled DOM tree 500, related nodes 510 are joined by "links" 520, representing the relationships between two nodes 510. In the example unlabeled DOM tree 500, links 520 are established between nodes 510-1 and 510-2 and between nodes 510-3 and 510-1.

In the example unlabeled DOM tree 500, nodes 510-3 and 510-2 are disposed on a second tier below the first tier occupied by node 510-1, reflecting a structure wherein the content element or zone represented by node 510-1 includes the content elements or zones represented by nodes 510-2 and 510-3. Although only the link 520 between nodes 510-1 and 510-2 is labeled, this label is provided for simplicity, and other, like, links 520 may be likewise labeled without loss of generality or departure from the scope of the disclosure.

Figure 6:
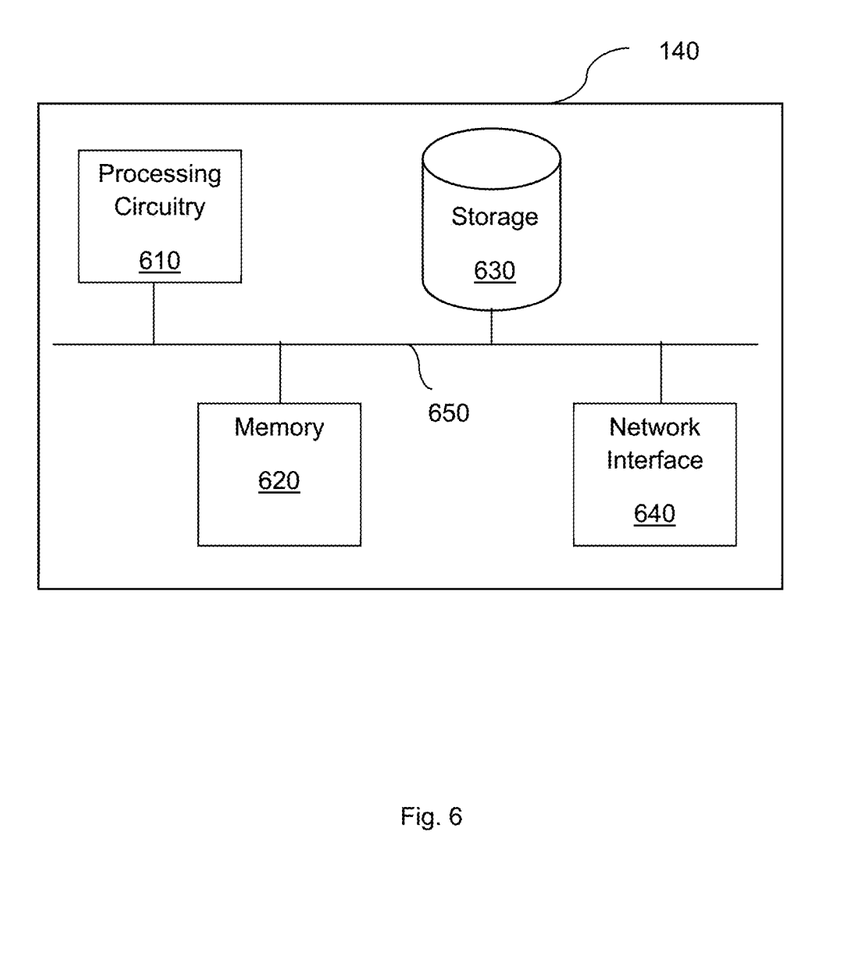
FIG. 6 is a schematic diagram of an analytic server, according to an embodiment.

FIG. 6 is an example schematic diagram of the analytic server 140, according to an embodiment. The analytic server 140 includes a processing circuitry 610 coupled to a memory 620, a storage 630, and a network interface 640. In an embodiment, the components of the analytic server 140 may be communicatively connected via a bus 650.

The processing circuitry 610 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 620 may be volatile (e.g., random access memory, etc.), non-volatile (e.g., read only memory, flash memory, etc.), or a combination thereof.

In one configuration, software for implementing one or more embodiments disclosed herein may be stored in the storage 630. In another configuration, the memory 620 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 610, cause the processing circuitry 610 to perform the various processes described herein.

The storage 630 may be magnetic storage, optical storage, and the like, and may be realized, for example, as flash memory or another memory technology, compact disk-read only memory (CD-ROM), Digital Versatile Disks (DVDs), or any other medium which can be used to store the desired information.

The network interface 640 allows the analytic server 140 to communicate with the various components, devices, and systems described herein for identifying and correcting webpage zone target misidentifications, as well as other, like, purposes.

It should be understood that the embodiments described herein are not limited to the specific architecture illustrated in FIG. 6, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Further, a non-transitory computer readable medium is any computer readable medium except for a transitory propagating signal.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

All examples and conditional language recited herein are intended for pedagogical purposes to aid the reader in understanding the principles of the disclosed embodiments and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method comprising:
    importing session replay data, the session replay data comprising data describing one or more historical user journeys through at least one webpage, the session replay data including one or more session events;
    extracting, from the imported session replay data, zoning information, wherein the zoning information includes at least one of descriptions of zones of a webpage, or descriptions of zone contents of the webpage;
    performing a zone target misidentification process using the zoning information extracted from the imported session replay data, the zone target misidentification process comprising clustering a plurality of webpage nodes based at least in part on the zoning information to identify at least two similar webpage node clusters, wherein the clustered plurality of webpage nodes are included in the zoning information, and at least two webpage node clusters indicate a zone target misidentification, the clustering comprising:
  extracting target paths from the plurality of webpage nodes, each of the target paths including information describing a relationship between a first zone to a second zone in the webpage, the target paths comprising at least a first target path of a first webpage node of the webpage, the first target path defining only one target, and the first target path causing a one target for multiple zones (OTMZ) error;
  clustering a first webpage node in the first zone and a second webpage node in the second zone based at least in part on the extracted target paths;
  determining, based at least in part on a first distance factor, that the first webpage node has a greater similarity with the second zone than the first zone; and
  providing an indication of a particular zone target misidentification for the first webpage node in response to the determining, the particular zone target misidentification for the first webpage node being based on the first target path identifying different zones across multiple pageviews of the webpage for the only one target;
generating a zone identification issue fix suggestion for each zone target misidentification, wherein the zone identification issue fix suggestion is a suggestion providing a correction for a respective zone target misidentification, the zone identification issue fix based on session replay data features determined from the zone target misidentification process using the zoning information extracted from the imported session replay data, the generating comprising:
  determining a target misidentification fix based on an analysis of a client identity; and
applying each of the generated zone identification issue fix suggestions on a respective zone target misidentification.

2. The method of claim 1, wherein the session replay data is recorded during a session of a user, a session event from the session replay data comprises a user interaction during the session of the user with a webpage zone or element, and the user interaction includes a set of keystrokes by which a user enters text in a text field, mouse clicks by which the user activates a button, a set of mouse scroll events, navigation to or from a webpage.

3. The method of claim 1, wherein extracting, from the imported session replay data, the zoning information further comprises:
  identifying and recording at least one of webpage HTML information, webpage DOM information, zone or element targets, or zone or element target paths, wherein the webpage nodes comprise HTML nodes.

4. The method of claim 1, wherein generating the zone identification issue fix suggestion further comprises:
  collecting at least one zone target misidentification, wherein the at least one zone target misidentification includes a target path, the target path comprises a node which is improperly clustered during clustering of the plurality of webpage nodes;
  determining the target misidentification fix to fix the at least one zone target misidentification;
  applying the determined target misidentification fix on the webpage; and
  updating zoning information according to the determined target misidentification fix.

5. The method of claim 4, wherein
  determining the target misidentification fix is further based on analysis of a current zone identity, analysis of a current zone classification, or analysis of at least a pageview.

6. The method of claim 5, wherein analysis of at least the pageview further includes:
  analysis of at least at least one of an HTML, element or a CSS element.

7. The method of claim 5, wherein analysis of the pageview further includes:
  determining whether applying a particular target misidentification fix to at least one of an HTML element or a CSS element corrects the respective zone target misidentification.

8. The method of claim 4, wherein the determined target misidentification fix comprises at least one of a custom fix, or a new target fix.

9. The method of claim 4, wherein the determined target misidentification fix comprises a misidentification fix schedule including at least one of a custom fix, or a new target fix.

10. A non-transitory computer readable medium having stored thereon instructions for causing processing circuitry to execute a process, the process comprising:
  importing session replay data, the session replay data comprising data describing one or more historical user journeys through at least one webpage, the session replay data including one or more session events;
  extracting, from the imported session replay data, zoning information, wherein the zoning information includes at least one of descriptions of zones of a webpage, or descriptions of zone contents of the webpage;
  performing a zone target misidentification process using the zoning information extracted from the imported session replay data, the zone target misidentification process comprising clustering a plurality of webpage nodes based at least in part on the zoning information to identify at least two similar webpage node clusters, wherein the clustered plurality of webpage nodes are included in the zoning information, and at least two webpage node clusters indicate a zone target misidentification, the clustering comprising:
    extracting target paths from the plurality of webpage nodes, each of the target paths including information describing a relationship between a first zone to a second zone in the webpage, the target paths comprising at least a first target path of a first webpage node of the webpage, the first target path defining only one target, and the first target path causing a one target for multiple zones (OTMZ) error;
    clustering a first webpage node in the first zone and a second webpage node in the second zone based at least in part on the extracted target paths;
    determining, based at least in part on a first distance factor, that the first webpage node has a greater similarity with the second zone than the first zone; and
    providing an indication of a particular zone target misidentification for the first webpage node in response to the determining, the particular zone target misidentification for the first webpage node being based on the first target path identifying different zones across multiple pageviews of the webpage for the only one target;
  generating a zone identification issue fix suggestion for each zone target misidentification, wherein the zone identification issue fix suggestion is a suggestion providing a correction for a respective zone target misidentification, the zone identification issue fix based on session replay data features determined from the zone target misidentification process using the zoning information extracted from the imported session replay data, the generating comprising:
   determining a target misidentification fix based on an analysis of a client identity; and
applying each of the generated zone identification issue fix suggestions on a respective zone target misidentification.

11. A system comprising:
a processing circuitry; and
a memory, the memory including instructions that, when executed by the processing circuitry, cause the processing circuitry to perform operations comprising:
importing session replay data, the session replay data comprising data describing one or more historical user journeys through at least one webpage, the session replay data including one or more session events;
extracting, from the imported session replay data, zoning information, wherein the zoning information includes at least one of descriptions of zones of a webpage, or descriptions of zone contents of the webpage;
performing a zone target misidentification process using the zoning information extracted from the imported session replay data, the zone target misidentification process comprising clustering a plurality of webpage nodes based at least in part on the zoning information to identify at least two similar webpage node clusters, wherein the clustered plurality of webpage nodes are included in the zoning information, and wherein at least two webpage node clusters indicate a zone target misidentification, the clustering comprising:
   extracting target paths from the plurality of webpage nodes, each of the target paths including information describing a relationship between a first zone to a second zone in the webpage, the target paths comprising at least a first target path of a first webpage node of the webpage, the first target path defining only one target, and the first target path causing a one target for multiple zones (OTMZ) error;
   clustering a first webpage node in the first zone and a second webpage node in the second zone based at least in part on the extracted target paths;
   determining, based at least in part on a first distance factor, that the first webpage node has a greater similarity with the second zone than the first zone; and
   providing an indication of a particular zone target misidentification for the first webpage node in response to the determining, the particular zone target misidentification for the first webpage node being based on the first target path identifying different zones across multiple pageviews of the webpage for the only one target;
generating a zone identification issue fix suggestion for each zone target misidentification, wherein the zone identification issue fix suggestion is a suggestion providing a correction for a respective zone target misidentification, the zone identification issue fix based on session replay data features determined from the zone target misidentification process using the zoning information extracted from the imported session replay data, the generating comprising:
   determining a target misidentification fix based on an analysis of a client or website identity; and
applying each of the generated zone identification issue fix suggestions on a respective zone target misidentification.

12. The system of claim 11, wherein the session replay data is recorded during a session of a user, a session event from the session replay data comprises a user interaction during the session of the user with a webpage zone or element, and the user interaction includes a set of keystrokes by which a user enters text in a text field, mouse clicks by which the user activates a button, a set of mouse scroll events, navigation to or from a webpage.

13. The system of claim 11, wherein the operations further comprise:
identifying and recording at least one of webpage HTML information, webpage DOM information, zone or element targets, or zone or element target paths, wherein the webpage nodes comprise HTML nodes.

14. The system of claim 11, wherein the operations further comprise:
collecting at least one zone target misidentification, wherein the at least one zone target misidentification includes a target path, the target path comprises a node which is improperly clustered during clustering of the plurality of webpage nodes;
determining the target misidentification fix to fix the at least one zone target misidentification;
applying the determined target misidentification fix on the webpage; and
updating zoning information according to the determined target misidentification fix.

15. The system of claim 14, wherein the operations further comprise:
determining the target misidentification fix further based on analysis of a current zone identity, analysis of a current zone classification, or analysis of at least a pageview.

16. The system of claim 15, wherein analysis of at least the pageview further includes analysis of at least at least one of an HTML, element or a CSS element.

17. The system of claim 15, wherein analyzing the pageview further includes determining whether applying a particular target misidentification fix to at least one of an HTML element or a CSS element corrects the respective zone target misidentification.

18. The system of claim 14, wherein the determined target misidentification fix comprises at least one of a custom fix, or a new target fix.

19. The system of claim 14, wherein the determined target misidentification fix comprises a misidentification fix schedule including at least one of a custom fix, or a new target fix.

20. The method of claim 1, wherein the first distance factor describes a similarity of two or more target paths within a first cluster of webpage nodes associated with the first zone, and
determining, based on the first distance factor, that the first webpage node has the greater similarity with the second zone than the first zone comprises:
determining a first distance value between a first target path of the first webpage node and a third target path of a third webpage node, the first webpage node and the third webpage node being included in the first zone;
determining a second distance value between the first target path of the first webpage node and a second target path of the second webpage node, the first target path and second target path being different; and determining that the first webpage node is more similar based on a comparison between the first distance value and the second distance value.

21. The method of claim 1, wherein the first target path comprises a plurality of HTML elements, the first target path defines a hierarchical path starting from a first HTML element from the plurality of HTML elements to a second HTML element from the plurality of HTML elements, and continuing from the second HTML element to a third HTML element from the plurality of HTML elements, and the third HTML element defines a target of the first target path.

22. The method of claim 1, wherein the first target path defines a same target and identifies a search bar for a first pageview and a home button for a second pageview causing the OTMZ error, and the first pageview and second pageview are different pageviews of the webpage.

\* \* \* \* \*